United States Patent [19]
Bond

[11] 4,012,450
[45] Mar. 15, 1977

[54] CATALYTIC REACTIONS

[75] Inventor: Geoffrey Colin Bond, London, England

[73] Assignee: Johnson Matthey & Co., Limited, London, England

[22] Filed: Apr. 4, 1975

[21] Appl. No.: 565,260

Related U.S. Application Data

[62] Division of Ser. No. 76,449, Sept. 29, 1970, abandoned.

[30] Foreign Application Priority Data

Oct. 1, 1969 United Kingdom ............ 48277/69
Oct. 30, 1969 United Kingdom ............ 53200/69
Nov. 14, 1969 United Kingdom ............ 55883/69

[52] U.S. Cl. .................... 260/604 HF; 252/429 R; 252/428; 260/449 R
[51] Int. Cl.² .................. C07C 45/08; C07C 45/10
[58] Field of Search ............................. 260/604 HF

[56] References Cited
UNITED STATES PATENTS 3,487,112 12/1969 Paulik et al. ................ 260/604 HF
3,733,362 5/1973 Biale ........................... 260/604 HF
3,855,307 12/1974 Rony et al. .................. 260/604 HF OTHER PUBLICATIONS
Wilkinson, G., Bull. Soc. Chim. France, No. 12, 1968, pp. 5055-5058.

Primary Examiner—James O. Thomas, Jr.
Assistant Examiner—W. B. Lone
Attorney, Agent, or Firm—Cushman, Darby & Cushman

[57] ABSTRACT

A process of carrying out hydrogenation, hydroformylation, and carbonylation reactions using as a catalyst a hydrido-carbonyl bis (trisubstituted phosphine, arsine, or stibine), or a hydrido-carbonyl tris (tri-substituted phosphine, arsine, or stibine), or a halogen or pseudohalogen-containing complex which has been formed from a halide or pseudo-halide of a platinum group metal and at least one biphyllic ligand.

13 Claims, 2 Drawing Figures

CATALYTIC REACTIONS

This is a division of application Ser. No. 76,449 filed Sept. 29, 1970, and now abandoned.

This invention relates to improvements in methods of performing certain types of catalytic reactions of chemical compounds.

BRIEF DESCRIPTION OF THE PRIOR ART

In our British Pat. No. 1138601 it is demonstrated that unsaturated organic compounds may be successfully hydrogenated, hydroformylated or carbonylated by reaction with $H_2$ and/or CO in the presence of a solution of a complex containing a halogen or pseudo-halogen, which complex has been formed from a halide or pseudo-halide of a platinum group metal and at least one ligand which is:

a. an organic isocyanide; or
b. an organic compound having in its molecule an atom of an element of Group 5B or 6B of the periodic table, said atom possessing a lone pair of electrons; or
c. a stannous or germanium -II halide.

In our cognate British Patent application Nos. 37017/68, 20961/69 and 20962/69 we show that good results for the hydroformylation of olefinically unsaturated compounds may be obtained by using as catalyst a hydrido carbonyl bis (tri substituted phosphine) rhodium or a hydrido carbonyl tris (trisubstituted phosphine) rhodium compound as catalyst.

We also show that, under the conditions of the reaction, these hydrido rhodium compounds can be produced from halogeno- or pseudo-halogeno complexes of rhodium such as:

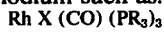

or

where X is the halogen or pseudo-halogen atom and R is normally an organic substituent.

These reactions proceed under milder conditions than are required for the conventional OXO synthesis using cobalt octacarbonyl as catalyst, and, in some instances the ratio of primary to secondary aldehydes in the product is extremely good.

In the development of industrial processes based on these reactions, a number of difficulties may be expected, for example:

1. The inherent limitations of using batchwise operation in comparison with continuous processes.
2. The difficulty of securing adequate mixing between the catalyst in the liquid phase and vapour phase reactants.
3. The difficulty of separating the products, if liquid, from the catalyst containing solution, and
4. The difficulty of efficient recovery and re-use of the catalyst solution without treatment.

A number of chemical engineering problems such as heat-transfer may also be experienced on scaling-up the process.

It is an object of the present invention to reduce at least some of these difficulties.

BRIEF SUMMARY OF THE INVENTION

According to one feature of this invention a process for the hydrogenation, hydroformylation or carbonylation of an unsaturated organic compound comprises contacting the compound with a catalyst obtained by absorbing on to a solid porous support a solution of hydrido carbonyl bis(tri-substituted phosphine) rhodium compound or a hydride carbonyl tris (tri-substituted phosphine) rhodium compound, or a halogen or pseudo-halogen containing complex which has been formed from a halide or pseudo-halide of a platinum group metal, and at least one ligand which is either:

a. an organic isocyanide
b. an organic compound having in its molecule an atom of an element of Group 5B or 6B of the Periodic Table, said atom possessing a lone pair of electrons or
c. a stannous or germanium -II halide.

According to a further feature of this invention a catalyst for use in hydrogenation, hydroformylation and carbonylation reactions comprises a solid porous support on to which has been absorbed a solution of a hydrido carbonyl bis (trisubstituted phosphine) rhodium compound or a hydrido carbonyl tris (tri-substituted phosphine) rhodium compound or a halogen or pseudo-halogen containing complex which has been formed from a halide or pseudo-halide of a platinum group metal and at least one ligand which is either:

a. an organic isocyanide
b. an organic compound having in its molecule an atom of an element of Group 5B or 6B of the Periodic Table, said atom possessing a lone pair of electrons or
c. a stannous or germanium -II halide.

Preferably the solid porous support is packed into a column through which the reacting compounds pass in the vapour phase.

A catalyst according to the invention is particularly suitable for the hydroformylation of olefins to primary and secondary aldehydes. In this case an olefin (preferably a terminal olefin) in the vapour phase is passed through the column with a mixture of hydrogen and carbon monoxide.

Suitable temperatures are for carrying out the process of the invention from room temperatures to 200° C and suitable pressures are from ½ to 500 atmospheres.

Suitable solvents are those which are inert and effectively involatile under reaction conditions, e.g. water, ethanol, ethylene glycol, polythene glycol, propylene glycol, glycerol, pinacol, benzene, toluene, the xylenes, etc., or mixtures of these.

Other solvents that can be used are hydrocarbons, ketones (for example, pinacolone, boiling point 119° C), aliphatic or aromatic carboxylic acids (for example, hexanoic acid, boiling point about 205° C, stearic acid, boiling point 383° C, or benzoic acid, boiling point 249° C), polycarboxylic acid, (for example, phthalic acid, boiling point 190° C, or citric acid, melting point 153° C), esters of mono- or polycarboxylic acids (for example, dibutyl phthalate, boiling point 340° C) or esters of inorganic acids (for example, tritolyl phosphate, boiling point 400° C), and ethers.

Suitable supports are porous impure silica, for example, that sold under the Trade Mark "Silocal", granular charcoal, alpha or gamma alumina granules or pellets, naturally occuring or synthetic alumino-silicates such as pumice and similar materials.

Unsaturated organic compounds which may be hydrogenated, hydroformylated or carbonylated are acetylenic compounds, carbonyl compounds, olefinic compounds, especially in the case of hydroformylation, terminally olefinic compounds containing 2–10 carbon atoms. Other more complex unsaturated compounds may also be successfully subjected to the process of the invention.

Suitable solutions for absorption are solutions of

Rh H(CO)(PR$_3$)$_3$

Rh H(CO)(PR$_3$)$_2$ or

Rh H(CO)$_2$(PR$_3$)$_2$ wherein the R groups may be the same or different and they may be aryl, alkyl or aralkyl radicals or substituted aryl, alkyl or aralkyl radicals.

The substituents may be halogen aryloxy, alkoxy, hydroxy, nitro amino, substituted amino or phenyl groups.

Preferred compounds are Rh H(CO)(P Ph$_3$)$_3$ Rh H(CO)(PPL$_3$)$_2$ and Rh H(CO)$_2$(PPh$_3$)$_2$ where Ph = C$_6$H$_5$.

Alternatively the solutions may be of compounds which form hydrido carbonyl bis or tris (trisubstituted phosphine) rhodium under the conditions of the reaction. Examples of such compounds are Rh X(CO)(PR$_3$)$_3$ or Rh X(CO)(PR$_3$)$_2$ where R is as above and X is a halogen or pseudo-halogen. The chlorocompound is preferred.

According to a further feature of this invention a process for the hydrogenation, hydroformylation or carbonylation of an organic compound comprises contacting the compound in the presence of hydrogen and/or carbon monoxide with a solution of a hydrido carbonyl bis (trisubstituted phosphine, arsine or stibine) rhodium or a hydrido carbonyl tris (trisubstituted phosphine, arsine or stibine) rhodium compound or a halogen or pseudo-halogen containing complex which has been formed from a halide or pseudo-halide of a platinum group metal and at least one ligand which is either:

a. an organic isocyanide
b. an organic compound having in its molecule an atom of an element of Group 5B or 6B of the Periodic Table, the said atom possessing a lone pair of electrons or
c. a stannous or germaniun -II halide, in which said solution is allowed to pass through a bed of porous or non-porous particles and in which the reactant gas stream flows concurrently or countercurrently through the bed. Preferably, the said solution percolates under gravity through the bed of porous or non-porous particles.

In a preferred embodiment the solution is circulated and after emerging from the base of the bed, it is returned to the top of the bed. In a further preferred embodiment, volatilized solvent is separated from the reaction products and unreacted gases by a trap and the solvent is recycled to rejoin the catalyst solution.

According to yet a further feature of this invention a process for the hydroformylation or carbonylation of an organic compound in the vapour phase comprises contacting said compound with hydrogen and carbon monoxide in the presence of a hydridocarbonyl bis (trisubstituted phosphine, arsine or stibine) rhodium or a hydrido carbonyl tris (trisubstituted phosphine, arsine or stibine) rhodium compound deposited upon a carrier, e.g. a solid carrier, as a catalyst.

The invention also includes a catalyst material comprising a hydrido carbonyl bis (trisubstituted phosphine, arsine or stibine) rhodium or a hydrido carbonyl tris (trisubstituted phosphine, arsine or stibine) rhodium compound upon a carrier. Examples of carrier material will be referred to hereinafter.

In accordance with a feature of the present invention, olefinic compounds are converted selectively in the vapour phase to aldehydes having one more carbon atom than the olefinic compounds by reacting the olefinic compounds, in contact with a solid catalyst, with carbon monoxide and hydrogen at temperatures from about 15° to 250° C and at presures of from ½ to 500 atmospheres although higher pressures may be employed.

In carrying out the hydroformylation reaction selectively to produce aldehyde, it is preferable to supply at least 1 mole of carbon monoxide and 1 mole of hydrogen for each mole of olefin reacted. Excess carbon monoxide or hydrogen over the aforesaid stoichiometric amounts, however, may be present. The ratio of hydrogen to carbon monoxide preferably has a molar ratio of at least 1. Any ratio of hydrogen to carbon monoxide from 10:1 to 1:10 may be chosen, but ratios from 1:1 to 4:1 are preferred. Increasing the ratio of hydrogen to carbon monoxide is found to increase the reaction rate.

The gas feed to the reaction zone can also include inert gases such as nitrogen and carbon dioxide, particularly if it is desired to control the heat output resulting from the exothermic hydroformylation reaction. Consequently various synthesis and reformer gas streams available industrially may be used.

Suitable organo-phosphorus, organo-arsenic, and organo-antimony ligands which may comprise part of the rhodium co-ordination compound or other catalyst of this invention are those consisting of tertiary organo-phosphorus, organo-arsenic and organo-antimony compounds in which the phosphorus, arsenic and antimony atoms are trivalent and are referred to in this specification as phosphines, arsines and stibines, respectively. In the group of suitable ligands containing the trivalent phosphorus, arsenic, and antimony atoms employed in the catalyst of this invention, the individual phosphorus, arsenic and antimony atom has one available or unshared pair of electrons. An aryl or aryloxy derivative of trivalent phosphorus, arsenic and antimony with the foregoing electronic configuration is, therefore, a suitable ligand for the rhodium catalyst of this invention. Such radicals, therefore, are bonded to the phosphorus, arsenic and antimony atoms, and the radicals are selected from the group consisting of aryl and aryloxy groups. However, the preferred phosphine, arsine and stibine ligands are those consisting of at least one, but preferably three aryl- and/or aryloxy groups as the organic moieties. For example, preferred ligands are illustrated by the following structural formula and examples: MR$_3$ where M is P, As, Sb, and R-phenyl (C$_6$H$_5$—), phenoxy (C$_6$H$_5$O—), tolyl (CH$_3$(C$_6$H$_4$)—)

xylyl(CH$_3$.C$_6$H$_3$.CH$_3$)

e.g.,

As

However, a more preferred group of ligands includes the triphenylphosphines, triphenylphosphites and triphenylarsines. The essential component is the aryl or aryloxy group e.g. the phenyl or phenoxy radical. However, the molecule may also contain some aryl groups in addition to the aryloxy radical.

A particular advantage of the hydrido carbonyl tris (tri-substituted phosphine) rhodium compounds, when used as a component of the solid catalyst system of this invention is their unusual stability. These compounds are extremely stable at elevated temperatures. Hydroformylation catalysts described in the prior art often undergo substantial decomposition under conditions necessary for product isolation, catalyst recovery and recycling processing, and are, therefore, less suitable.

Another advantage of this solid catalyst system is its ability to produce predominantly straight chain aldehyde products, and substantially no alcohols, paraffins or other by-products even after long use. Catalysts employed in processes of the prior art generally cause production of substantial quantities of paraffins, alcohols and/or other undesirable high boiling by-products such as acetals etc., in addition to the desired aldehydes.

The solid supported rhodium complex catalyst of this invention is preformed prior to charging the reactor.

The carrier or substrate which is employed in the present catalysts consists of a porous solid of such size that it can be employed in fixed or fluidised-bed reactors, e.g. from 400 mesh/inch and ⅜-inch particle sizes. The range of variation of the pore volume relative to solid weight is from 0.05 to 2.0 cm$^3$/gram of the porous phase, with a preferred range of from 0.05 to 2.0 cm$^3$/gram.

The carrier materials are exemplified, but not limited by pumice, alumina (alpha or gamma) silica, silica-alumina, aged or deactivated silica-alumina cracking catalyst, synthetic alumino silicates, magnesia, diatomaceous earth, bauxite, titani zirconia, clays, both natural and acid treated such as the Super-Filtrols, attapulgus clay (attapulgite), lime, magnesium silicate, silicate, silicon carbide, activated and inactivated carbons, zeolites as well as the zeolitic molecular sieves, soli foams, such as ceramic honeycombs, and porous organic polymers. The above carriers are used as regular and irregular particles and as capillary tubes, and interspacing elements such as shapes, extrudates, ceramic rods, balls, broken pieces, tiles, and the like disposed within the reactor.

The solvent which is used to dissolve or disperse the rhodium complex catalytic component is a material having a low boiling point, e.g. high vapour pressure under reaction conditions. The range of variation of the boiling point (NBP, 760 mm Hg) is quite broad, a preferred range being from 10° to 120° C.

It has been found that the preparation of a solid catalyst which is uniform in composition is preferably accomplished by the use of a volatile solvent component in the impregnation of an initially dry porous support with a catalytic component dissolved in the said solvents. The normal boiling point of the volatile liquid solvent is in the range of from 10° to 120° C. A preferable group of volatile solvents includes chloroform, carbon tetrachloride, benzene, acetone, methanol, ethanol, isopropanol, isobutanol, pentane, hexane, cyclohexane, heptane, toluene, pyridine, diethylamine, acetyaldehyde, acetic acid and hydrofuran.

The preparation of the solid phase catalyst is carried out by first dissolving or dispersing the rhodium complex in the above described volatile solvent. The solid carrier is then impregnated with the solution of the rhodium complex, for example by pouring the solution upon the carrier, or immersing the solid carrier in an excess of the liquid solution, with the excess being subsequently removed.

The impregnated support or carrier is then maintained at a temperature sufficient to volatilise the solvent, preferably at a temperature between 15° and 250° C, to permit drying of the composite solid catalyst. A vacuum may also be applied to the catalyst in order to volatilise the solvent, although the use of vacuum is not essential. During this stage of the process, the volatile solvent evaporates from the solid catalytic product. The final product is a solid supported catalyst.

In accordance with the invention, the vapour phase hydroformylation reaction is carried out by intimately contacting the gaseous olefin with gaseous carbon monoxide and hydrogen in the presence of the complex metal catalyst such as hydrido carbonyl bis (triphenylphosphine) rhodium (I) dispersed upon an inert carrier such as alumina, at such temperatures and pressures suitable to form the hydroformylated product. The temperature accordingly is in the range of 15° to 250° C. With the preferred range being 100° to 165° C. Carbon monoxide partial pressure of the order of 1 atmosphere or less may be employed; however, 150 psig to 500 psig partial pressure of carbon monoxide is generally preferred. Higher partial pressure, even to the extent of 750 psig and higher, of course, may be used if desired under appropriate conditions.

In general, higher rhodium complex loadings on the catalysts produce a faster reaction rate. Loadings of rhodium complex on the inert carrier (based on rhodium metal content) between 0.1 wt.% and 5 wt.% are generally satisfactory, with a preferred range being 0.3 wt.% to 3 wt.%.

The hydroformylation reaction of the present invention is conducted with olefinic feedstock having from 2 to 15 carbon atoms or preferably 2 to 5 carbon atoms, including both monoolefins and diolefins. The use of propylene as the feedstock for the production of butyraldehydes, has been found to favour the production of n-butyraldehyde relative to isobutyraldehyde. The invention also includes other olefins, e.g. ethylene to obtain propionaldehyde, and decenes to obtain undecaldehydes. The various isomeric starting materials are also contemplated.

The method of conducting the present invention is to make use of a solid phase catalytic based upon a rhodium complex dispersed upon a porous support. The temperature at which the reaction is conducted is sufficient to permit the withdrawal of the aldehyde products as a vapour or gas stream from the reaction zone wherein the olefin feedstock is charged as a vapour to the said solid phase catalytic system. The apparatus employed is conventional in vapour phase processes being composed of catalytic reactors in which the supported catalyst is located, for example, as packed towers or as trays of the catalyst, with suitable feed discharge means for the gaseous reactants and the recovery and separation of the liquid aldehyde and alcohol products from any unreacted gases. The use of a vapour phase operation avoids the leaching out of the active catalytic coordination complexes as would be encountered in a liquid phase process.

The product gas stream is passed through separation means for recovery of the aldehyde product, while unreacted olefins as well as carbon monoxide and hydrocarbon are recycled to the reaction zone.

In carrying out the typical hydroformylation reaction selective to produce aldehyde, it is necessary to supply at least one mole of carbon monoxide and one mole of hydrogen for each mole of olefin reacted. Excess carbon monoxide or hydrogen over the aforesaid stoichiometric amounts, however, may be present. The ratio of hydrogen and carbon monoxide preferably has a molar ratio of at least 1. Any ratio of hydrogen to carbon monoxide from 10:1 to 1:10 may be chosen, but ratios from 1:1 to 4:1 are preferred. Increasing the ratio of hydrogen to carbon monoxide is found to increase the reaction rate.

The gas feed to the reaction zone can also include inert gases such as nitrogen and carbon dioxide, particularly if it is desired to control the heat output resulting from the exothermic hydroformylation reaction. Consequently, various synthesis and reformer gas streams may be used.

The invention will now be described by way of Example and with reference to the accompanying drawings.

DETAILED DESCRIPTION OF THE EMBODIMENT

Example I

Figure 1:
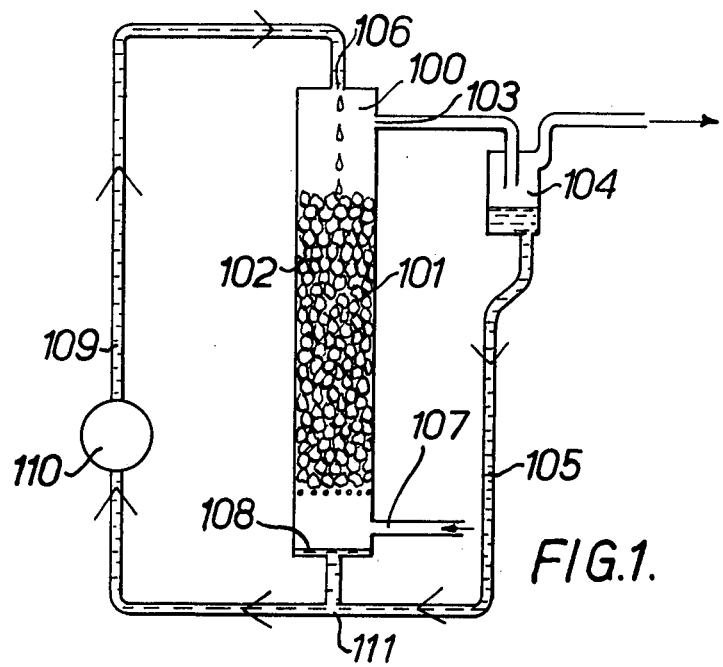
FIG. 1 is a schematic cross-section of an apparatus containing a reaction column for use in the hydroformylation of an olefin.

Referring now to FIG. 1, the apparatus shown comprises a reaction column 100 comprising a tube 101 containing a bed of granules 102 which may be, for example, activated carbon granules, alpha or gamma alumina granules or pellets, and naturally occurring on synthetic alumino-silicates such as pumice or Silocel (Registered Trade Mark).

At the bottom of the tube 101 there is provided an inlet pipe 107 for introducing hydrogen, carbon monoxide and olefin into the tube. At the top of the tube 101 there is provided an outlet pipe 103 for withdrawing the product from the tube. The outlet pipe 103 leads to a trap 104 for separating solvent from the products. A solvent pipe 105 is attached to the trap for conducting the solvent out of the trap.

A catalyst inlet 106 is provided at the top of the tube 101 for introducing catalyst solution into the tube 101. A catalyst outlet 108 is provided at the bottom of the tube for withdrawing catalyst solution from the tube 101. The catalyst inlet 106 and the catalyst outlet 108 are connected by a catalyst pipe 109, and a pump 110 is provided in the catalyst pipe 109 for pumping the catalyst solution to the catalyst inlet 106. The solvent pipe 105 joins the catalyst pipe 109 at the junction 111 so that both the solvent recovered in the trap 104 and the catalyst solution are constantly recycled through the tube 101.

This apparatus is particularly suitable for the hydroformylation of olefins to primary and secondary aldehydes. In this case an olefin (preferably a terminal olefin) in the vapour phase is passed through the column with a mixture of hydrogen and carbon monoxide.

Suitable temperatures are from 20° to 250° C and suitable pressures are from 1 to 35 atmospheres.

Suitable solvents for the catalysts are those which are inert under reaction conditions, e.g. water, ethanol, ethylene glycol, polythene glycol, propylene glycol, glycerol, pinacol, benzene, toluene, the xylenes, etc., or mixtures of these.

Other solvents that can be used are hydrocarbons, ketones (for example, pinacolone, boiling point 119° C), aliphatic or aromatic carboxylic acids (for example, n-hexanoic acids, boiling point about 205° C) esters of mono- or polycarboxylic acids (for example, dibutyl phthalate, boiling point 340° C) or esters of inorganic acids (for example, tritolyl phosphate, boiling point 400° C), and mixtures of these. Other solvent systems may also be used.

Unsaturated organic compounds which may be hydrogenated hydroformylated or carbonylated are acetylenic compounds, carbonyl compounds, olefinic compounds, especially in the case of hydroformylation, terminally olefinic compounds containing 2–10 carbon atoms. Other more complex unsaturated compounds may also be successfully subjected to the process of the invention.

The hydrido rhodium compounds for solutions are;

or

wherein M is P, As or Sb, the R groups may be the same or different and they may be aryl, alkyl or aralkyl radicals or they may be substituted aryl, alkyl or aralkyl radicals.

The substituents may be halogen, arylkoxy, alkoxy, hydroxy nitro, amine, substituted amine or phenyl groups.

The preferred compounds are RhH (CO)(PPh$_3$)$_3$, Rh H(CO)(PPh$_3$)$_2$ and Rh H(CO) 2 (PPh$_3$)$_2$ where Ph = phenyl. Alternatively the solutions may be of compounds which form hydride carbonyl bis or tris (trisubstituted phosphine arsine or stibine) rhodium under the conditions of the reaction. Examples of such compounds are Rh X(CO)PR$_3$)$_2$ where R is as above and X is halogen or pseudo-halogen. The chloro compound in which R = Ph is preferred.

Example II

Figure 2:
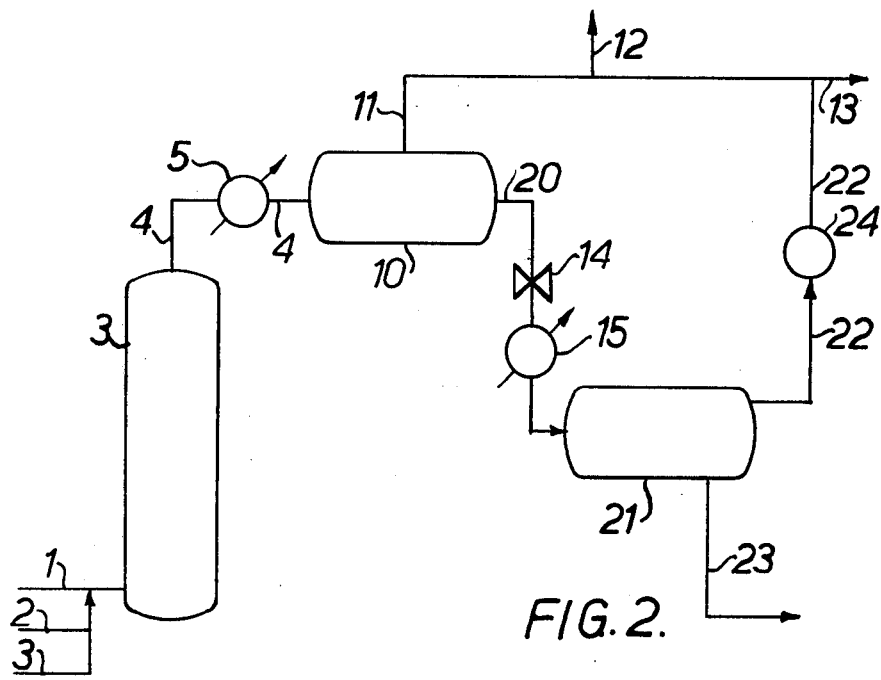
FIG. 2 is a flow diagram which shows how one aspect of the process of the invention may be carried out.

FIG. 2 shows a vapour phase process wherein the reactant olefin (e.g. propylene) and the hydroformylated product (e.g. butyraldehyde) are removed in the vapour effluent from the reactor. In this operation propylene feed is introduced into reactor 3 through line 1, while the hydrogen and carbon monoxide feed (e.g. synthesis gas) is introduced through line 2. A recycle gas stream consisting principally of hydrogen and carbon monoxide with a small quantity of propylene is introduced through line 8. Catalytic reactor 3 contains the supported catalyst which is present, for example, as a fixed bed of catalyst. The typical catalyst loading is about 0.35 wt.% (based on metal content), and comprises the rhodium complex hydrido carbonylbis (triphenylphosphine) rhodium(I) dispersed on an inert support such as 10–30 mesh, low surface area, porous alumina. The reactor operates at about 125° C and 500 p.s.i.g. total pressure (carbon monoxide partial pressure about 240 p.s.i.g.)

The gaseous reactor effluent, containing propylene, butyraldehyde, CO, and $H_2$ exits through line 4, and is partially condensed in condenser 5 at about 10° C. The condensed phase consisting of greater than 90% butyraldehyde is separated from the non-condensables in a high pressure separator 10. The gases exit the separator through line 11, and after removal of a purge stream through line 12 to prevent build-up of inert gases, the remaining gases are vented at line 13, or preferably are recycled. The condensed phase is removed from high pressure separator 10 through line 20, let down in pressure through valve 14, cooled in exchanger 15, and then separated in vessel 21. The gases which contain dissolved propylene, liberated on reduction in pressure, exit through line 22, are repressured in compressor 24, and combine with line 11 gases to form the gaseous stream available at 13 for recycling.

The liquid from separator 21 represents the crude butyraldehyde which passes out through line 23 to the aldehyde purification area.

Although butyraldehyde is the desired product from the hydroformylation process of this invention, the butyraldehyde can be further processed to n-butanol, iso-butanol, and 2-ethylhexanol by combination of subsequent separation, aldol-condensation, and hydrogenation steps.

Example III

The benzene/ethanol solution of the rhodium in Example 6 of British Pat. No. 1138601 was absorbed on to 20g. of a porous impure silica (Registered Trade Mark "Silocel") and the resulting dry product was placed in a high pressure reaction column. Hexene-1 and hydrogen and carbon monoxide were passed through at a temperature of 70° C and a total pressure of 100 atmospheres.

Example IV

Triphenyl phosphine and rhodium trichloride in approximately 5:1 molar ratio were refluxed in ethanol for 2–3 hours. On cooling purple crystals of the complex $(Ph_3P)_3Rh'Cl$ were obtained in virtually quantitative yield based on the rhodium value. The crystals were separated, washed with a little cold ethanol to remove excess triphenyl phosphine and dried.

The catalyst (0.25 g) was dissolved in benzene (25 ml.) and ethanol (25 ml.)

The benzene ethanol solution was absorbed on to 20 g. of a porous impure silica (Registered Trade Mark "SILOCEL") and the resulting dry product was placed in a high pressure reaction column. Hexene-1 and hydrogen and carbon monoxide were passed through at a temperature of 70° C and a total pressure of 100 atmospheres.

Condensation and distillation of the resulting mixture yielded n-heptaldehyde and 2 methyl caproic aldehyde.

Example V 0.25 g of $RhH(CO)(PPh_3)_3$ was dissolved in 50 ml benzene. The solution was absorbed on to 20 g of a porous impure silica (Registered Trade Mark "SILOCEL") and the resulting dry product was placed in a high pressure reaction column. A 1:1:1 mixture of alkene (or cyclo alkene) hydrogen and carbon monoxide at a temperature of 50° C and 1200 psig pressure was passed through the column.

Condensation, distillation and analysis of the resulting products in all cases detected a measurable quantity of the corresponding aldehyde:

| Alk-L-ene | Corresponding aldehyde |
| --- | --- |
| Propene | n-Butyraldehyde |
| But-1-ene | n-valeraldehyde |
| Pent-1-ene | n-hexaldehyde |
| Hex-1-ene | n-heptaldehyde |
| Cis/trans Pent-2-ene | 2-methyl valeraldehyde |
| Cyclo hexene | Cyclohexyl aldehyde |

Condensation and distillation of the resulting mixture yielded n-hepaldehyde and 2-methyl caproic aldehyde.

What is claimed is:

1. A process for the hydroformylation of an olefin, comprising passing a mixture of said olefin, hydrogen and carbon monoxide through a reaction zone where said mixture contacts a catalyst comprising a solid porous support having absorbed thereon a solution of a catalytic compound selected from the group consisting of $RhH(CO)$  $(PPh_3)_3$ $RhH(CO)$  $(PPh_3)_2$ and $RhH(CO)_2$  $(PPh_3)_2$ where Ph is $C_6H_5$, in a solvent which is inert and essentially involatile under the reaction conditions, maintaining an effective amount of said catalytic compound absorbed on said support by feeding additional solution into said zone countercurrently with respect to the passage of said mixture through said zone, collecting the gaseous reaction product after passage of the mixture through said catalyst and separating therefrom any solvent therein, collecting any catalyst solution fed to said zone which is not absorbed by said support and recycling the separated catalyst solution and solvent separated from said reaction product to said reaction zone for absorption on said porous support.

2. A process according to claim 1 wherein the solid porous support is granular and is packed into a column through which the said unsaturated compound, hydrogen and carbon monoxide are passed in the vapour phase.

3. A process according to claim 1, the process being performed at a temperature from room temperature to 200° C.

4. A process according to claim 1, the process being performed at a pressure from 0.5 atmospheres to 500 atmospheres.

5. A process according to claim 1 in which the solvent is a hydrocarbon, an alcohol, a ketone, a carboxylic acid, an ester or an ether.

6. A process according to claim 5 in which the alcohol is ethanol, ethylene glycol, polythene glycol, propylene glycol, glycerol or pinacol.

7. A process according to claim 5 in which the hydrocarbon is benzene, toluene or a xylene.

8. A process according to claim 2 wherein said granular solid porous support is impure silica, charcoal, alpha- or gamma-alumina, or naturally occurring or synthetic alumino silicates.

9. A process according to claim 1 wherein said compound is a terminal olefinic compound having from 2 to 10 carbon atoms.

10. A process according to claim 1 wherein at least one mole of carbon monoxide and at least one mole of hydrogen is supplied for each mole of olefin.

11. A process according to claim 10 wherein the molar ratio of carbon monoxide to hydrogen is from 1:10 to 10:1.

12. A process according to claim 10 wherein the molar ratio of carbon monoxide to hydrogen is from 1:4 to 4:1.

13. A process according to claim 1 wherein the pore volume per unit weight of the solid carrier of the catalyst is from 0.05 to 2.0 cm$^3$/gram.

* * * * *